June 5, 1956  W. L. HULSLANDER  2,748,589
VALVE LOCK
Filed Oct. 27, 1952
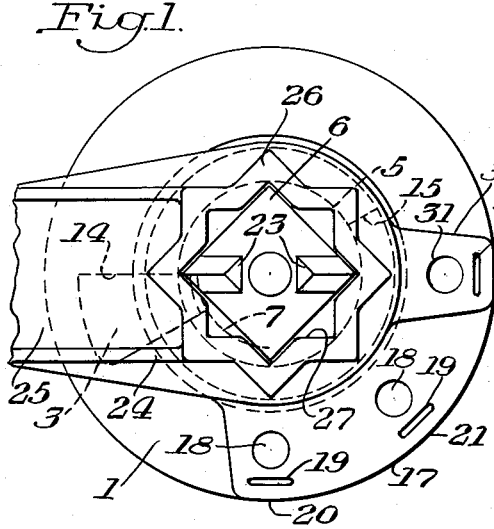
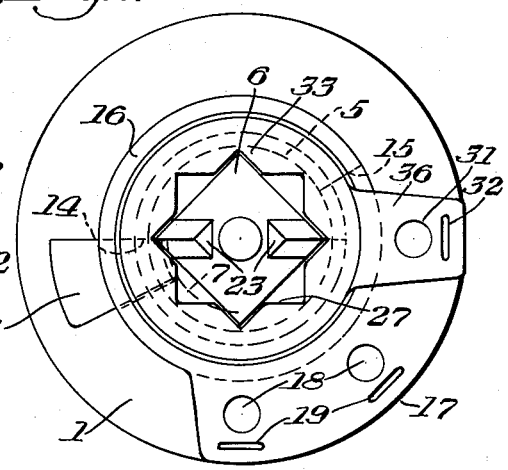
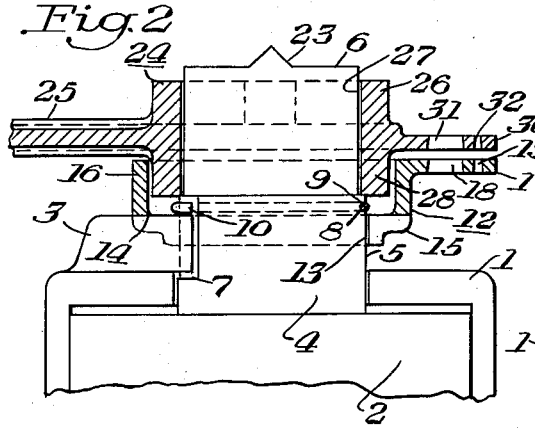
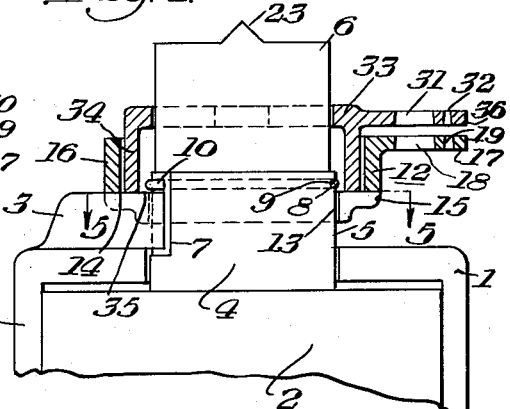
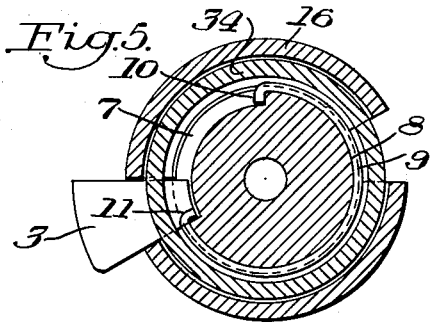
INVENTOR.
William L. Hulslander.
BY
William D. Carothers
HIS ATTORNEY.

United States Patent Office 2,748,589
Patented June 5, 1956

2,748,589
VALVE LOCK

William L. Hulslander, Osborne, Pa., assignor to Homestead Valve Manufacturing Company, Coraopolis, Pa., a corporation of Pennsylvania Application October 27, 1952, Serial No. 317,001

4 Claims. (Cl. 70—180)

This invention relates generally to valve locks, and more particularly to an improved valve lock structure.

Valve locks are old in the art. The patents to Clade, 2,271,475, and Lyles, 1,491,051, are typical examples, and they both have structural disadvantages. In the Clade structure, the cap plate must always be connected with the lock plate. It is frequently desirable to remove the cap plate alone, or to have both plates separate. To remove the cap plate in these patented structures, it is necessary to disturb the setting of the valve. Again, a special tool is required to remove the set screw of Clade. These are definite disadvantages in the field.

In the Lyles structure, one can, without too much obvious deception, cut the bolts holding the lock plate structure on the valve, thus permitting one to tamper with the valve setting. This structure also requires the use of long bolts as special parts for the valve. Special parts for standard items are disadvantageous to any commodity, and they increase the inventory.

The principal object of this invention is the provision of a new and improved structure that eliminates these disadvantages. The valve comprising this invention may be locked in its open, closed or selected intermediate positions and may be unlocked in each instance and removed without disturbing the valve setting. When locked the valve locking mechanism cannot be disturbed or removed and the setting of the valve cannot be tampered with.

Other objects and advantages appear hereinafter in the following description and claims.

The accompanying drawings show, for the purpose of exemplification, without limiting the invention or claims thereto, certain practical embodiments of the invention wherein:

Fig. 1 is a plan view of the valve lock comprising this invention wherein the valve handle is a part of the locking mechanism.

Fig. 2 is a sectional view of the structure shown in Fig. 1.

Fig. 3 is a plan view of the valve lock comprising this invention wherein the locking device does not provide a handle.

Fig. 4 is a sectional view of the structure shown in Fig. 3.

Fig. 5 is a sectional view taken on the line 5—5 of Fig. 4.

Referring particularly to the structure shown in Figs. 1 and 2, the valve housing is illustrated at 1, which contains the valve, as illustrated at 2.

The head of the valve casing 1 is provided with an upwardly extending lug or abutment 3. The valve member 2 is provided with an upwardly extending stem 4, the first part of which has a cylindrical circumference as illustrated at 5. The outer end of the stem is made to receive an operating lever or cap plate, as illustrated at 6, which is square in this instance. The cylindrical portion 5 is provided with an arcuate indentation or recess 7, which receives the end of the lug 3. The lug, as shown in Fig. 5, limits the rotary movement of the valve, as illustrated in Fig. 5.

The valve stem is provided with an arcuate recess 8, adjacent the upper end of the cylindrical portion 5, for receiving the keeper 9, which is likewise shown in Fig. 5. The keeper 9 is preferably provided with inturned ends 10 and 11 that extend into the recess 7 to lock the keeper 9 in the groove 8.

The valve lock plate 12 has a circular opening 13 that fits snugly over the cylindrical portion 5 of the valve and is provided with slots 14 and 15 on the under side thereof for the purpose of receiving the lug 3. The slots are cut into the under side of the valve locking plate 12.

The valve locking plate 12 is provided with an upwardly extending wall 16 having an outwardly extending or radial flange 17. This flange may be provided with one or more openings such as illustrated at 18 and 19 for receiving a padlock and seal member. As shown in Fig. 1, the flange 17 is provided with openings at three positions, one wherein the valve is closed, as indicated at 20, and one wherein the valve is opened at forty-five degrees, as indicated at 21, and the third position is indicated at 22 where the valve is fully opened, which is the position as shown. The top of the valve stem is provided with a projection 23 that indicates the position of the valve, and as illustrated in Fig. 1, the valve is in its opened position.

The locking cap plate, which is illustrated at 24 in Figs. 1 and 2, is provided with a handle 25, thus making this cap plate into a wrench. This handle wrench is provided with a hub member 26 that has an opening, illustrated at 27, the corners of which will fit the square corners of the valve stem 6. As illustrated in Fig. 1, the hub member extends above and below the handle 25. This lower portion of the hub depends within the upwardly extending wall 16 of the locking plate, as illustrated at 28. The bottom of the hub rests on the shoulder formed between the cylindrical portion 5 and the portion 6 of the valve stem.

The hub has an outwardly extending flange 30 provided with cooperating openings 31 and 32 that mate with the openings 18 and 19 in the flange 17, for the purpose of receiving the hasp of a padlock through the openings 18 and 31, and the seal is inserted through the openings 18 and 32, in the position in which the valve is set.

In the structure shown in Figs. 3, 4, and 5, the locking plate is the same. However, the valve wrench or operating handle has been replaced by the valve cap member 33 which has a depending skirt 34 and is concentric with and fits within the upwardly extending wall 16 of the locking plate. The skirt 34 rides on the bottom surface 35 of the lock plate 12. The cap plate 33 also is provided with an outwardly extending flange 36 that has openings 31 and 32 that correspond with the openings 18 and 19 of the flange 17 and the locking plate.

As shown in Fig. 5, the flange 34 nests snugly in the upstanding wall 16, and prevents anything from being inserted along the lower part of the valve stem to remove the keeper 9. In any valve position of either of the structures of Figs. 1 and 3, the keeper is protected at all times. It is a very easy element to remove and reapply when the cap plate is removed. All that is needed is a sharp implement, such as a knife or a screw driver and the valve locking device may be entirely removed from the valve stem without disturbing or otherwise changing the valve setting or it may be replaced in a different position. Again, the valve locking plate may be set in different positions, and the valve cap plate or wrench device may likewise be set in different positions relative to the valve locking plate so as to maintain the valve in its opened or closed position or in an intermediate position.

The lug 3 on the valve casing head determines the limiting positions of the valve regardless of the locking device, and thus, the only thing that is added to this standard valve structure is the annular groove 8 for receiving the keeper 9. Otherwise, this structure is the same as any other valve of this size, and it may readily be converted to a locking valve structure by adding the locking plate and the cap plate and the keeper 9. The use of the lug 3 is extended from limiting the rotation of the valve to preventing the locking plate from turning on the valve casing.

While for clarity of explanation certain embodiments of this invention have been shown and described it is to be understood that this invention is capable of many modifications, and changes in the construction and arrangement may be made therein and certain parts may be employed with the conjoint use of other parts and without departing from the spirit and scope of this invention.

I claim:

1. A lock for a stem type valve member in a valve housing comprising an outwardly extending annular surface on said valve member, a lock plate having a bore to snugly fit said annular surface and interlock with said valve housing to prevent rotation of said lock plate on said annular surface, a keeper removably attached to said annular surface above and directly engaging said lock plate to retain said lock plate in interlocked position on said valve housing, a cap plate independent of said keeper covering said keeper and mounted on said valve stem to turn therewith, and registry means in both of said plates in the on and off and intermediate positions of said valve to permit locking and sealing of said plates together for locking said valve at a selected position.

2. The structure of claim 1 characterized in that said cap plate has a depending annular wall terminating closely adjacent said lock plate and enclosing the keeper on said valve stem.

3. The structure of claim 1 characterized in that said lock plate has an upwardly extending annular wall surrounding said valve stem and the keeper thereon, and said cap plate has a depending annular wall fitting in the annular wall of said lock plate and enclosing the keeper on said valve stem.

4. The structure of claim 1 characterized in that said cap plate is provided with a handle to operate said valve stem.

References Cited in the file of this patent

UNITED STATES PATENTS

| | | |
|---|---|---|
| 1,491,051 | Lyles | Apr. 22, 1924 |
| 1,993,784 | Henderson | Mar. 12, 1935 |
| 2,271,475 | Clade | Jan. 27, 1942 |